United States Patent [19] [11] Patent Number: 4,762,381
Uemiya et al. [45] Date of Patent: Aug. 9, 1988

[54] OPTICAL ELEMENT INTEGRATED OPTICAL WAVEGUIDE AND PRODUCTION OF THE SAME

[75] Inventors: Takafumi Uemiya; Yutaka Shibata; Akira Nishimura; Shin-ichiro Niwa; Yoshitaka Osawa, all of Osaka, Japan

[73] Assignee: Sumitomo Electric Industries, Ltd., Osaka, Japan

[21] Appl. No.: 926,176

[22] Filed: Nov. 3, 1986

[30] Foreign Application Priority Data

Jan. 29, 1986 [JP] Japan ................................ 61-19129

[51] Int. Cl.$^4$ .............................................. G02B 6/12
[52] U.S. Cl. .................................. 350/96.11; 350/96.1; 350/96.12; 350/96.29
[58] Field of Search ............... 350/96.16, 96.26, 96.1, 350/96.29, 96.34, 96.25, 96.11, 96.12

[56] References Cited

U.S. PATENT DOCUMENTS

| 4,535,141 | 8/1985 | Kroupa | 350/96.1 X |
| 4,547,040 | 10/1985 | Yamamoto et al. | 350/96.34 |
| 4,557,550 | 12/1985 | Beals et al. | 350/96.16 X |
| 4,593,973 | 6/1986 | Yoshida et al. | 350/96.29 |
| 4,615,583 | 10/1986 | Tsuno et al. | 350/96.26 X |

Primary Examiner—John Lee
Assistant Examiner—John Ngo
Attorney, Agent, or Firm—Cushman, Darby & Cushman

[57] ABSTRACT

An optical element integrated optical waveguide comprising (1) a polymeric supporting member a length of which lies in a light transmission direction and which has at least one bore along its entire length, (2) at least one optical waveguide part consisting of organic siloxane polymer filling at least one bore, and (3) at least one optical element embedded in the optical waveguide part is provided.

18 Claims, 7 Drawing Sheets

OPTICAL ELEMENT INTEGRATED OPTICAL WAVEGUIDE AND PRODUCTION OF THE SAME

BACKGROUND OF THE INVENTION

1. Field of the Invention

The present invention relates to an optical element integrated optical waveguide and production of the same. More particularly, it relates to an optical waveguide with which a light emitting or receiving element is integrated and a method for producing said optical waveguide.

2. Description of the Prior Arts

Sometimes, light is transmitted through an optical waveguide by means of an optical element such as a light emitting element and a light receiving element. In such case, a connection should be made between the optical waveguide and the optical element.

FIG. 1 schematically shows a conventional optical waveguide comprising a polymeric tube 1 and an optical waveguide part 2 to which an optical element 3 is connected through a lens system 4. This type of connection requires the lens system and a connector (not shown) between the optical waveguide and the optical element and troublesome termination of the optical waveguide. Further, since there is an air gap between the optical waveguide and the optical element so that light is reflected at each interface, light transmission loss is increased. Such connection tends to be easily broken.

Since the conventional optical waveguide is generally made of a rigid material, its aperture cannot be made large to maintain flexibility of the optical waveguide. Therefore, an amount of light to be transmitted through one optical waveguide is small and connection loss of light transmission is increased.

Since the conventional optical waveguide is less flexible, its assembly with various equipments with which the optical element is combined is limited.

SUMMARY OF THE INVENTION

One object of the present invention is to provide an optical element integrated optical waveguide having flexibility.

Another object of the present invention is to provide an optical element integrated optical waveguide which can be easily assembled.

Further object of the present invention is to provide an optical element integrated optical waveguide having a large aperture and improved light transmission efficiency.

A yet another object of the present invention is to provide an optical element integrated optical waveguide which can be easily connected to other element, equipment or apparatus.

DETAILED DESCRIPTION OF THE INVENTION

Figure 1:
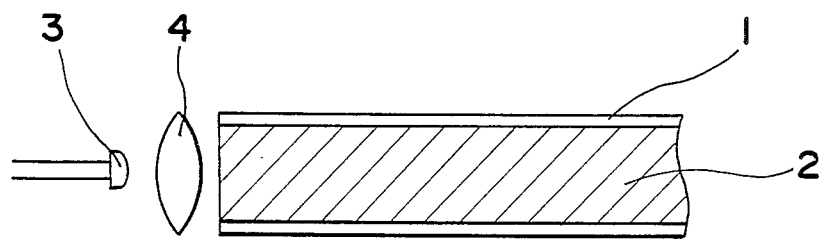
FIG. 1 shows a schematic transverse cross section of a conventional optical waveguide connected to an optical element.

According to one aspect of the present invention, there is provided an optical element integrated optical waveguide comprising (1) a polymeric supporting member a length of which lies in a light transmission direction and which has at least one bore along its entire length, (2) at least one optical waveguide part consisting of organic siloxane polymer filling at least one bore, (3) at least one optical element embedded in the optical waveguide part, (4) optionally, an intermediate layer provided with between the supporting member and the optical waveguide part, and (5) optionally, a rod like member and/or a tube like member embedded in the optical waveguide part and/or a wall of the supporting member and/or inserted in the bore in which organic siloxane polymer is not filled.

According to another aspect of the present invention, there is provided a method for producing the above described optical waveguide according to the present invention, which comprises steps of:

filling organic siloxane polymer and inserting an optical element in at least one bore of a polymeric supporting member a length of which lies in a light transmission direction and which has at least one bore along its entire length, and cross linking at least partially organic siloxane polymer to form an optical waveguide part.

The organic siloxane polymer may be filled in the bore before or after the optical element is inserted in the bore.

In this method, the inner surface of the bore may be applied with the intermediate layer, and the rod like member or the tube like member may be embedded in the wall of the supporting member and/or fixed in the bore.

The polymeric supporting member surrounding the optical waveguide part corresponds to a cladding of an optical fiber and usually is made of a polymeric material having a lower refractive index than that of the organic siloxane polymer of the optical waveguide part so that light propagated through the optical waveguide part is reflected at the interface between the supporting member and the optical waveguide part. The polymeric material for the supporting member may be a thermoplastic resin or an elastomer. Preferred examples of such material are fluorine-containing polymers such as tetrafluoroethylene/ hexafluoropropylene copolymers and polytetrafluoroethylene. Other examples are polychlorotrifluoroethylene, fluorine-containing polysiloxane, polyvinyl chloride, polyethylene and the like. Further, dimethylsiloxane rubber having a comparatively low refractive index may be used. To impart better flexibility to the optical waveguide, rubbery materials are preferred.

When the intermediated layer is provided with between the supporting member and the optical waveguide part, any material can be used as the material for the supporting member insofar as the intermediate layer has a lower refractive index than that of the optical waveguide part. Therefore, the supporting member may be made of plastics or elastomers having good mechanical properties.

The supporting member may be of any shape such as a tube, a plate or a tape. Further, the bore of the supporting member may have any cross sectional form such as round or square.

The optical waveguide part is made of a transparent organic siloxane polymer suitable for light transmission. According to the present invention, the organic siloxane polymer may be a liquid one or a solid one. That is, it may be in an elastic state such as rubber, a gel state or a liquid state. When the organic siloxane polymer is cross linked, it is not necessary to completely cross link it. The state of the siloxane polymer may vary from part to part along the whole length of the optical waveguide part. For example, only the end portions of the siloxane polymer is in the solid state while the rest of it is in the gel or liquid state. In such case, radiation dose to cross link the polymer is decreased in comparison with a case where the whole polymer is cross linked, so that energy cost can be reduced. When the whole siloxane polymer is in the liquid or gel state, its adhesion with the supporting member is kept good even when the optical waveguide is bent. The gel like siloxane polymer does not leak from the optical waveguide.

Any liquid siloxane polymer may be used to be filled in the bore of the supporting member. To produce the optical waveguide having a high refractive index, preferred are dimethylsiloxane/diphenylsiloxane copolymers and dimethylsiloxane/mehylphenylsiloxane copolymers.

The optical element includes a light emitting element and a light receiving element. In the optical waveguide of the invention, at least one optical element is provided with the optical waveguide part. For example, the light emitting element may be a commercially available LED as such which comprises a light emitting part (chip) surrounded by a transparent epoxy resin or the bare light emitting part itself. In the latter case, the transparent optical waveguide part has the same function as the transparent epoxy resin of the former.

The siloxane polymer near the optical element may be in the liquid state or other state. Since the light emitting element such as LED tends to be deteriorated by irradiation, preferably, the siloxane polymer surrounding the light element should not be radiated for cross linking.

The optional intermediate layer between the supporting member and the optical waveguide part is made of a material having a lower refractive index than that of the optical waveguide part. The intermediate layer is preferably provided with for example in the following cases:

The polymeric supporting member alone does not effectively protect the optical waveguide part and/or does not have enough mechanical strength;

To impart sufficient mechanical strength to the optical waveguide, the polymeric supporting member having a larger refractive index than that of the optical waveguide part should be used; and Flaws or roughness, which is formed on the inner surface of the bore during production of the supporting member by extrusion, adversely affects the light transmission.

The intermediate layer is preferably made of a siloxane polymer, a fluorosiloxane polymer, a fluorine-containing polymer, a polyvinyl acetate, a copolymer of ethylene and vinyl acetate, polyvinyl acetal, methyl cellulose and the like. When the intermediate layer is made of a less flexible material, its thickness should be made as thin as possible to maintain flexibility of the optical waveguide.

The rod like member and/or the tube like member are optionally provided with in the wall of the supporting member, the optical waveguide part and/or the bore. Usually, they extend along the whole length of the optical waveguide, although they may be present in a part of the optical waveguide. For example, they may be present only at a central part of the optical waveguide and exit from the side wall of the optical waveguide near the ends thereof.

As the rod-like member, an image fiber, an electrical conductor, wire or cable and a wire are exemplified. As the tube-like member, a pipe can be exemplified. The continuous space in the tube-like member is used as a conduit for a fluid or a hole for inserting an elongate material. When the rod-like or tube-like member is embedded in the wall of the supporting member, its peripheral surface is preferably coated with, for example, a fluorine-containing polymer to diminish light absorbance.

The organic siloxane polymer can be cross linked chemically or by irradiation or heating. Chemical cross linking is carried out with a cross linking agent such as peroxides and a cross linking aid such as a platinum catalyst. Irradiation is carried out by α-ray, β-ray, γ-ray, X-ray or electron beam.

The optical element integrated optical waveguide of the present invention is preferably produced by poring the liquid siloxane polymer into the bore of the supporting member, providing the optical element in the poured siloxane polymer and then cross linking the siloxane to integrate the optical waveguide part and the optical element. Alternatively, the optical waveguide part including the optical element is firstly produced by poring the liquid siloxane in a mold, adding the optical element in the siloxane polymer and cross linking the siloxane polymer. Then, the optical waveguide part including the optical element is removed from the mold and surrounded by the supporting member.

Now, the preferred embodiments of the present invention will be illustrated by way of example with reference to the accompanying drawings. In these embodiments, the light emitting element is often used as the optical element although the light receiving element can be used in the same way.

FIGS. 2A to 2E show longitudinal cross sections of one embodiment of the optical element integrated optical waveguide according to the present invention each of which comprises an optical waveguide part, a supporting member and a light emitting element. FIG. 2F is a transverse cross section of the optical waveguide of FIG. 2A.

Figure 2A:
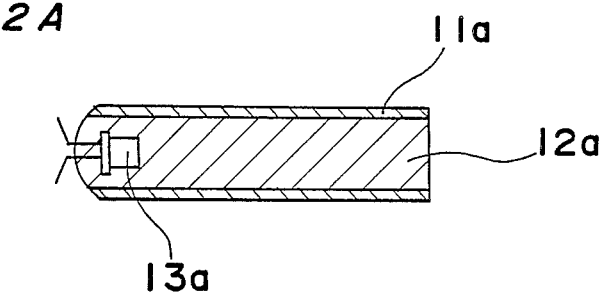
FIGS. 2A to 2F show cross sections of some embodiments of the optical element integrated optical waveguides according to the present invention.
Figure 2B:
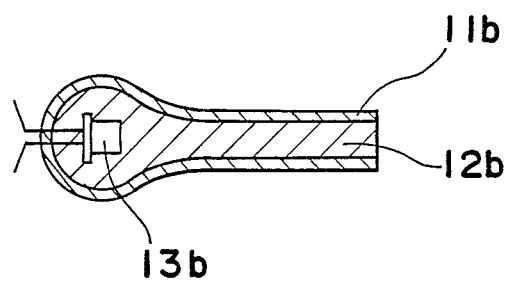
Figure 2C:
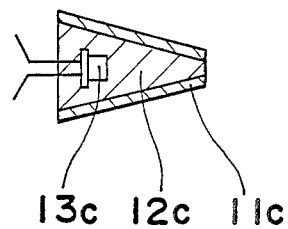
Figure 2D:
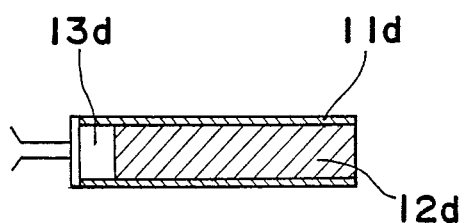
Figure 2E:
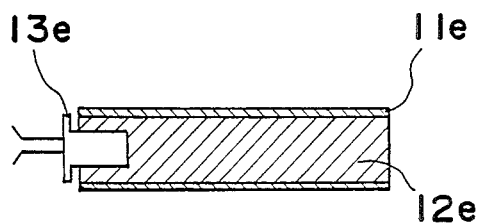
Figure 2F:
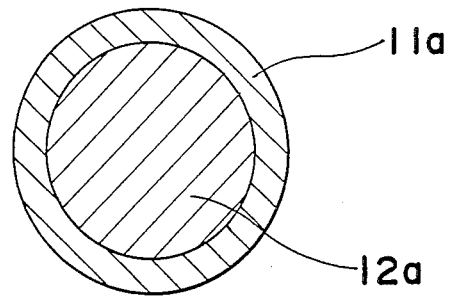

Referring to FIG. 2A, the optical waveguide part 12a is cylindrical and covered with the supporting member 11a, and its transverse cross sectional form does not change near the light emitting element 13a (see FIG. 2F).

In the optical waveguide of FIG. 2B, the optical waveguide part 12b expands near the light emitting element 13b and is covered with the supporting member 11b.

The transverse cross section of the optical waveguide part is not necessarily round and can be ellipsoidal, star-like, triangle or square. Further, as shown in FIG. 2C, the size of the optical waveguide part 12c may gradually change. The optical waveguide part 12c is covered with the supporting member 11c and has the largest cross sectional area near the light emitting element 13c.

In FIG. 2D, the light emitting element 13d contacts the optical waveguide part 12d and is supported by the supporting member 11d. According to the present invention, the light emitting element is not necessarily completely inserted into the supporting member. As shown in FIG. 2E, at least a part of the light emitting element 13e can be present in the optical waveguide part 12e which are covered with the supporting member 11e insofar as the light emitting member 13e is firmly fixed in the optical waveguide part 12e. When the optical waveguides of FIGS. 2A to 2E have comparative short length, they can be used in the same way as the commercially available LED which is embedded in the epoxy resin.

Figure 3:
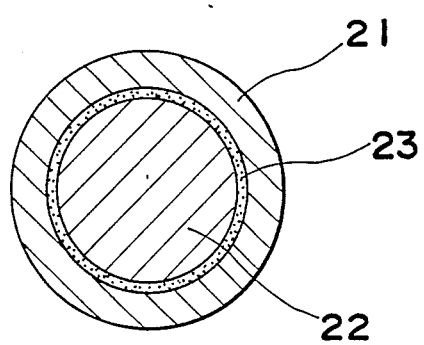
FIG. 3 shows a cross section of one embodiment of the optical element integrated optical waveguide according to the present invention having an intermediate layer.

FIG. 3 is a transverse cross section of one embodiment of the optical element integrated optical waveguide according to the present invention having an intermediate layer 23 between the the supporting member 21 and optical waveguide part 22. The refractive index of the intermediate layer 23 is lower than that of the optical waveguide part 22. Since the refractive index of the supporting member 21 is not necessarily lower than that of the optical waveguide part 22, the polymer of the supporting member 21 can be selected from wide variety of the materials. The intermediate layer 23 may be formed together with the production of the supporting member, for example, by co-extrusion of the supporting member and the intermediate layer. Alternatively, the intermediate layer may be formed by applying the material of the layer on the inner surface of the bore formed in the supporting member.

Although the following embodiments do not include any intermediate layer, they can be of course include it.

Figure 4B:
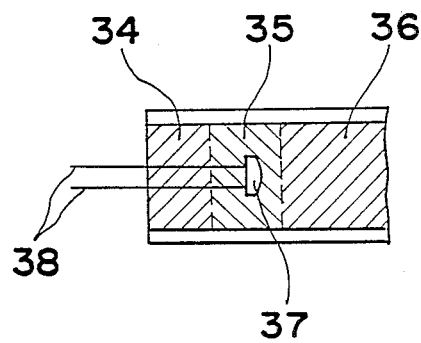
FIGS. 4A and 4B shows cross sections of one embodiment of the optical element integrated optical waveguide according to the present invention in which only end regions of an optical waveguide part are cured.
Figure 4A:
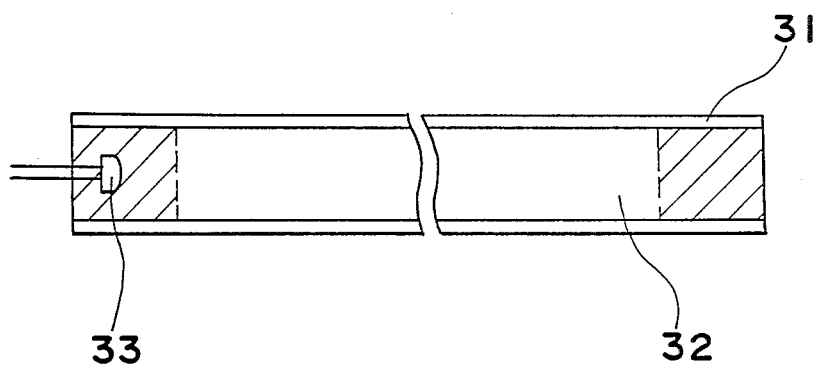

FIG. 4A shows a longitudinal cross section of one embodiment of the optical element integrated optical waveguide according to the present invention having an optical waveguide part a part of which comprises an uncross-linked siloxane polymer. In this embodiment, only the both end regions of the optical waveguide part are cross linked to solidify them while the rest of it is in the gel or liquid state. The refractive index of the supporting member 31 is lower than that of the part of the optical waveguide part 32 made of the liquid siloxane polymer. The hatched parts in FIG. 4A indicate the cured parts of the siloxane polymer, and the optical element 33 is embedded in either of the cured parts. By this embodiment, the optical element 33 is firmly fixed in the optical waveguide so that handling property at the end of the optical waveguide is improved. Since the cured parts of the siloxane polymer are present at the both ends of the optical waveguide, the liquid siloxane polymer does not leak from the optical waveguide.

Although the siloxane polymer to be filled in the bore of the supporting member should contain impurities in amounts as small as possible to minimize any factor that worsens the light transmission loss, the siloxane polymer in the end regions may be cross linked with a cross linking agent and/or a cross linking aid according to the embodiment of FIG. 4A. That is, the liquid siloxane polymer containing substantially no impurities is filled in a polymer tube and then the liquid siloxane polymer containing the cross linking agent and the like added not to disturb the interface between two layers of the liquid siloxane polymers. Then the optical element is inserted in the liquid siloxane polymer followed by cross linking of the siloxane polymer in the end region.

FIG. 4B shows a longitudinal cross section near the end of the optical waveguide where the optical element is embedded. The optical element is not necessarily embedded in the cured siloxane polymer. The outermost end region 34 of the optical waveguide part should consists of the cured siloxane polymer. The cured siloxane polymer fixes the bonding wires 38 and in turn the optical element 37 and prevents the leakage of the uncured liquid siloxane polymer. The siloxane polymer in the outermost end part 34 can be cross linked by any conventional method used for cross linking the siloxane polymer such as by irradiation and by means of the cross linking agent and/or the cross linking aid. The siloxane polymer 35 surrounding the optical element may be cured or not cured. When the siloxane polymer 35 is to be cured, it is preferably cross linked with the cross linking agent and/or the cross linking aid, particularly with a catalyst such as a platinum catalyst. Irradiation of the siloxane polymer 35 is not preferred since it deteriorates the optical element. The inner region 36 of the optical waveguide part may be in the liquid, elastic or solid state. When it is to be in the solid state, it can be cross linked by any conventional method as described in the above.

In the following embodiments, the siloxane polymer may be in the liquid state or in the solid state.

Figure 5:
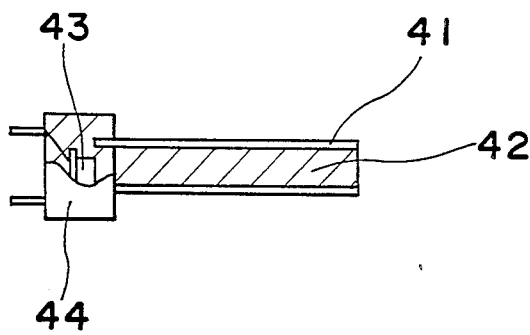
FIG. 5 shows a cross section of one embodiment of the optical element integrated optical waveguide according to the present invention having a casing for the optical element.

FIG. 5 shows a longitudinal cross section of one embodiment of the optical element integrated optical waveguide according to the present invention having a casing 44 to which the optical element 43 is connected to improve the connection of the optical element to an outer electric system. The optical waveguide part 42 has substantially the same structure as that of FIG. 2D, and a part of the optical element 43 is inserted in the supporting member 41.

Figure 6A:
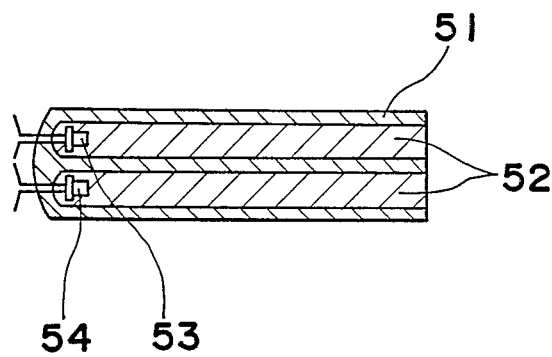
FIGS. 6A to 6D show cross sections of some embodiments of the optical element integrated optical waveguides according to the present invention having plural optical waveguide parts.
Figure 6B:
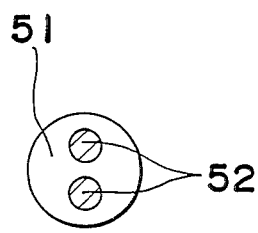
Figure 6C:
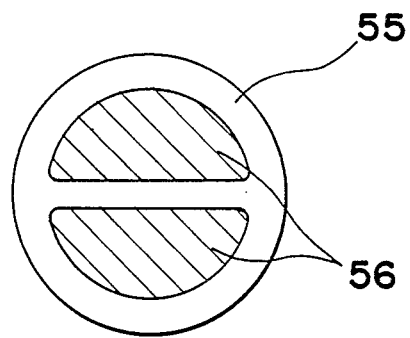

FIGS. 6A and 6B show longitudinal and transverse cross sections of one embodiment of the optical element integrated optical waveguide according to the present invention which comprises two optical waveguide parts 52 in one supporting member 51. Since the optical waveguide parts 52 contain the light emitting element 53 and the light receiving element 54, respectively, this embodiment of the optical waveguide is suitable as a detecting sensor. Although the transverse cross sections of the optical waveguide parts are round in FIG. 6B, they may have other cross sectional forms. For example, as shown in FIG. 6C, the cross-sections of the two optical waveguide parts 56 surrounded by the supporting member 55 can be semicircle. Further, the cross section of the optical waveguide part may be square.

Figure 6D:
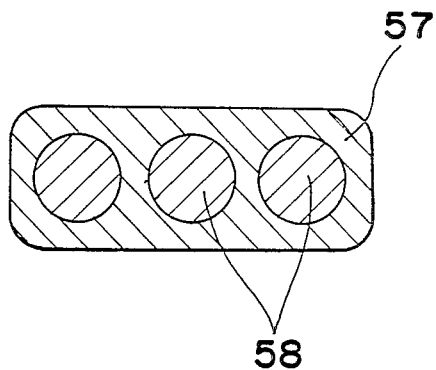

In one embodiment of the optical element integrated optical waveguide as shown in FIG. 6D, three (or more) optical waveguide parts 58 are contained in the supporting member 57. As explained hereinbefore, the cross sectional form of the optical waveguide, and the cross sectional form and the number of the optical waveguide part are not critical in the present invention. The optical waveguide part is not necessarily straight and may be helical or other form. When two or more optical waveguide parts are contained in the supporting member, at least one of them should have the optical element but the rest of them need not.

Figure 7A:
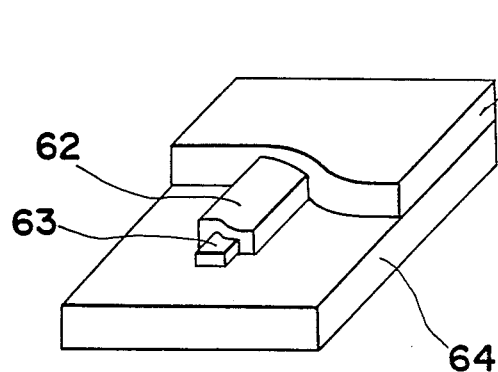
FIG. 7A is a perspective view of one embodiment of the optical element integrated optical waveguide according to the present invention comprising a substrate.
Figure 7B:
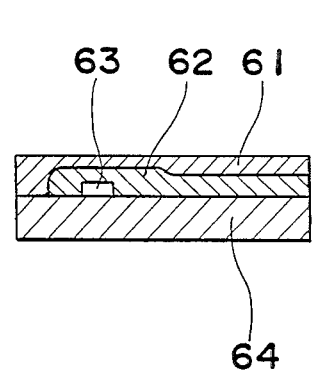
FIG. 7B shows a cross section of the optical waveguide of FIG. 7A.

FIGS. 7A and 7B show a partly removed perspective view and a longitudinal cross section, respectively of an embodiment of the optical element integrated optical waveguide of the present invention, in which the optical element 63 placed on a substrate 64 is covered with the optical waveguide part 62 which is covered with a protective layer 61. In this embodiment, the protective layer 61 provides the supporting member. The substrate 64 is made of any material which can reflect light such as a semiconductor substrate, a metal plate and a mirror. Preferably, the substrate is made of a plastic material. The optical element may be formed by growing a suitable material directly on the substrate.

Figure 7C:
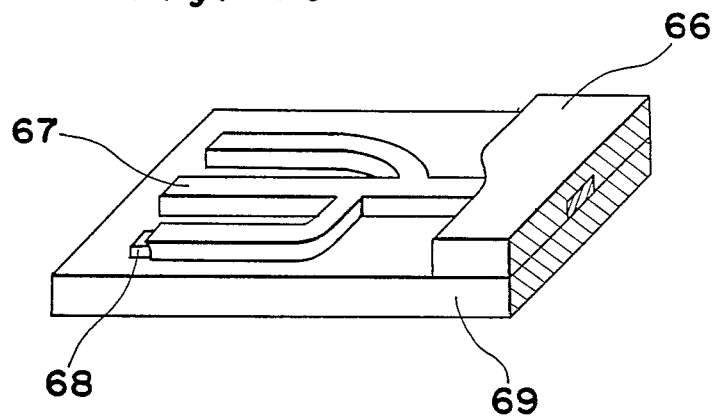
FIG. 7C is a perspective view of another embodiment of the optical element integrated optical waveguide according to the present invention comprising a substrate.

FIG. 7C shows a perspective view of another embodiment of the optical element integrated optical waveguide in which the optical element placed on the substrate is covered with the optical waveguide part. The optical waveguide part 67 formed on the substrate 69 is branched into three lines, each of which has one light emitting element 68 at its end. The optical waveguide part 67 is covered with the protective layer 66.

Figure 8:
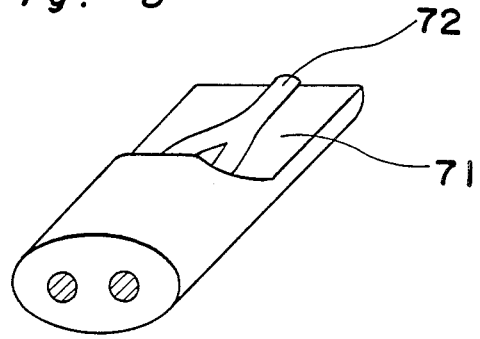
FIG. 8 is a perspective view of one embodiment of the optical element integrated optical waveguide according to the present invention having a branched optical waveguide part.

FIG. 8 shows a perspective view of one embodiment of the optical element integrated optical waveguide according to the present invention in which the optical waveguide part 72 is covered with the supporting member 71 and branched into two lines at one end, each of which lines has the light emitting element (not shown).

In the following embodiments, the optical element is not shown in figures for simplicity.

Figure 9A:
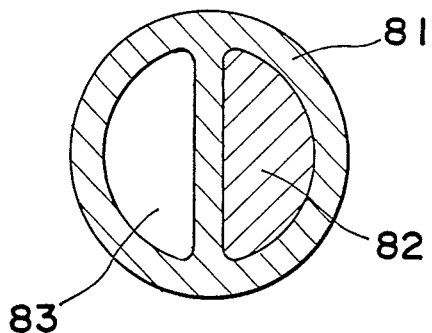
FIGS. 9A to 9D show cross sections of some embodiments of the optical element integrated optical waveguides according to the present invention having at least one vacant bore.
Figure 9B:
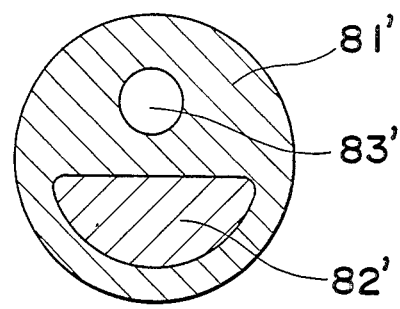
Figure 9C:
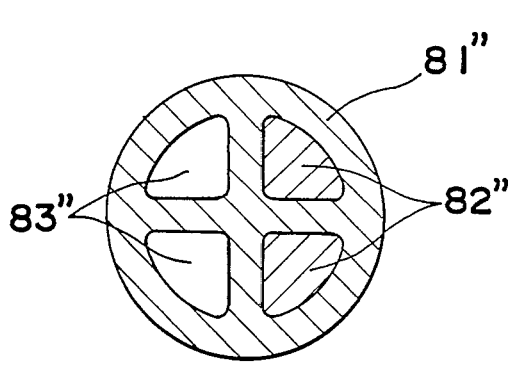

FIGS. 9A to 9C show transverse cross sections of embodiments of the optical element integrated optical waveguide according to the present invention which have at least one vacant bore in the supporting member. The optical waveguides of FIGS. 9A and 9B have one optical waveguide part 82 or 82' in the polymeric supporting member 81 or 81' and one vacant bore 83 or 83'. These bores in the optical waveguides of FIGS. 9A and 9B have different cross sectional forms. The optical waveguide of FIG. 9C has two optical waveguide parts 82" and two vacant bores 83". These optical waveguides of FIGS. 9A to 9C can be produced by pouring the liquid siloxane polymer in at least one of the bores in the supporting member and cross linking it with leaving the rest of the bores vacant. The numbers of the optical waveguide part and/or the vacant bores are not critical and not limited to these embodiments.

The vacant bore can be used for various purposes. For example, when the optical waveguide is to be used as a medical catheter, a liquid or a gas is passed through it and an image fiber is inserted into it. According to the applications of the optical waveguide, an electrical wire or cable or a wire may be inserted in the vacant bore.

Figure 9D:
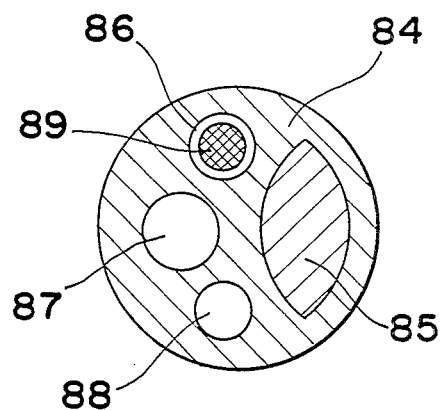

FIG. 9D shows a transverse cross section of one embodiment of the optical element integrated optical waveguide according to the present invention which is used as a catheter with a balloon inserted in a blood vessel. This catheter can be used for inspecting the interior of the blood vessel. The optical waveguide part 85 in the supporting member 84 is used as a light guide for transmitting illumination light and the light emitting element (not shown) is used as an illuminant. An image fiber 89 is inserted into one of three vacant bores and other two bores 87 and 88 are used for inflating the balloon and for flushing, respectively. After the front end of the catheter reaches a desired position in the blood vessel, the balloon is inflated by supplying a suitable liquid though the bore 87 to fix the catheter in the blood vessel. A quantity of blood in the blood vessel is removed by flushing a suitable liquid such as a physiological saline from the bore 88. Then, the interior of the blood vessel from which the blood is removed is inspected by means of the image fiber 89 with illuminating the interior by light transmitted through the light guide 88.

Figure 10A:
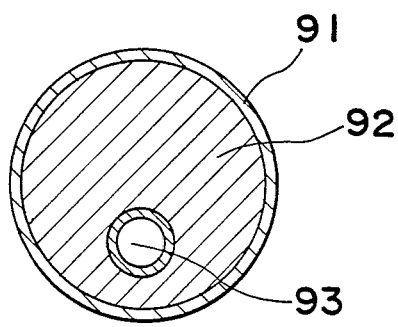
FIGS. 10A and 10B show cross sections of two embodiments of the optical element integrated optical waveguides according to the present invention having at least one tube like member.

FIG. 10A shows a transverse cross section of one embodiment of the optical element integrated optical waveguide according to the present invention having a tube like member. In this embodiment, the optical waveguide comprises the supporting member 91, the optical waveguide part 92 and a tube like member 93 embedded in the optical waveguide part 92. Instead of the tube like member, a rod like member may be embedded. Further, both the tube like member and the rod like member can be contained in the optical waveguide part. The numbers of the tube like member and/or the rod like member are not critical.

This embodiment of the optical waveguide can be produced as follows:

The tube 93 is firstly fixed in the supporting member 91 by attaching them to a suitable positioning means with applying slight tension to them. Then, the liquid siloxane polymer is poured between the supporting member 91 and the tube 93 with keeping them vertical. After the optical element is positioned, the siloxane polymer is cross linked to form the optical waveguide part.

Figure 10B:
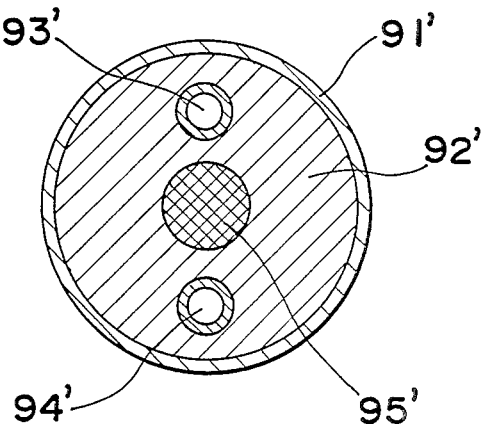

FIG. 10B shows a transverse cross section of one embodiment of the optical element integrated optical waveguide, which comprises the supporting member 91′, the optical waveguide part 92′, an image fiber 95′ and two tube like members 93′,94′. This optical waveguide is also used as a catheter. One of the tube like member serves for supplying a physiological saline to the balloon and the other serves removing air or the physiological saline from the balloon.

Figure 11A:
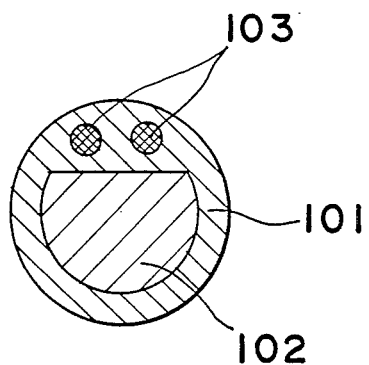
FIGS. 11A, 11B and 11C show cross sections of three embodiments of the optical element integrated optical waveguides according to the present invention having the tube like member and/or the rod like member in the wall of the supporting member.
Figure 11B:
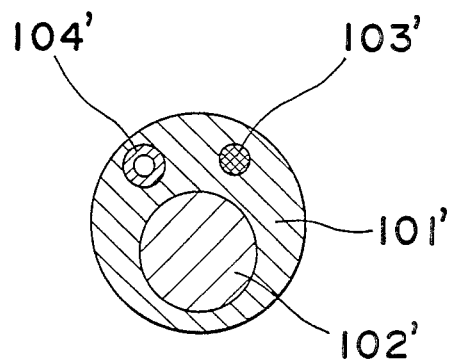
Figure 11C:
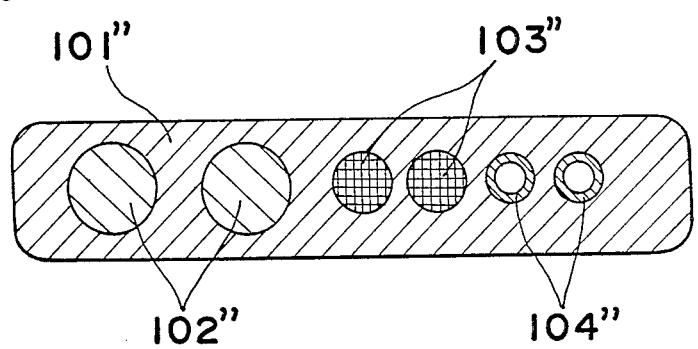

FIGS. 11A, 11B and 11C show transverse cross sections of three embodiments of the optical element integrated optical waveguide according to the present invention which contain the tube like member and/or the rod like member in the wall of the supporting member.

The optical waveguide of FIG. 11A comprises the supporting member 101, the optical waveguide part 102 and two rod like members 103 such as electrical wires, that of FIG. 11B comprises the supporting member 101′, the optical waveguide part 102′, the rod like member 103′ and the tube like member 104′, and that of FIG. 11C comprises the supporting member 101″, two optical waveguide parts 102″, two rod like member 103″ and two tube like member 104″. The tube like member and the rod like member are embedded in the wall of the supporting member. These optical waveguides can be produced by extruding the supporting member together with the rod like member and/or the tube like member, pouring the liquid siloxane polymer in the bore(s) and then cross linking the siloxane polymer.

The present invention includes embodiments in which the optical element integrated optical waveguides of FIGS. 10 and 11 are combined. That is, in such optical waveguide, the tube like members and/or the rod like members are embedded in the optical waveguide part and the wall of the supporting member.

Figure 12A:
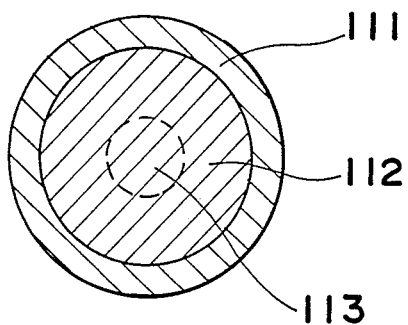
FIGS. 12A and 12B show cross sections of two embodiments of the optical element integrated optical waveguides according to the present invention.
Figure 12B:
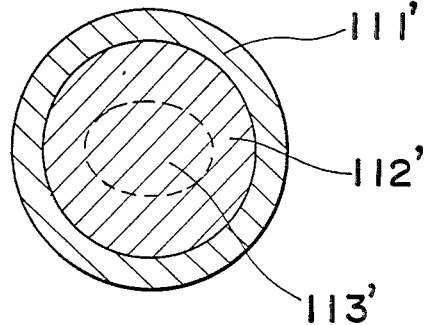
Figure 13:
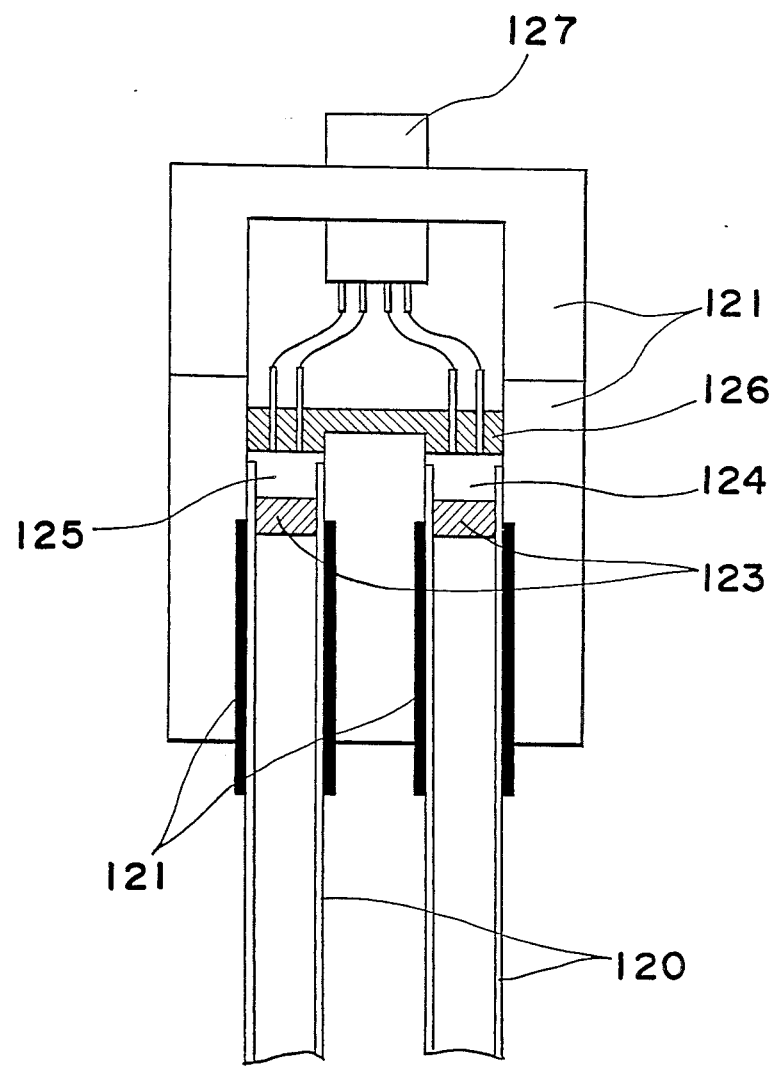
FIG. 13 shows a cross section of the optical element integrated optical waveguides produced in Example 3.

FIGS. 12A and 12B show transverse cross sections of one embodiment of the optical element integrated optical waveguide according to the present invention in which a part of the optical waveguide part, for example, along all the length of the optical waveguide part except the solidified end regions is in the liquid and gel states. In FIGS. 12A and 12B, the optical waveguide part comprises a liquid portion 112 or 112′ surrounded by a gel like portion 113 or 113′ encircled by broken line. Between FIGS. 12A and 12B, the cross sectional forms of the liquid portions are different. The optical waveguide of FIG. 12A may be produced by irradiating the supporting member 111 containing the liquid siloxane polymer from all directions uniformly to some depth of the optical waveguide part so as not to cross link the siloxane polymer in the liquid portion 113 having a circular cross section. The optical waveguide of FIG. 12B may be produced by irradiating the supporting member containing the liquid siloxane polymer from opposite two directions so as not to cross link the siloxane polymer in the liquid portion 113′ having an ellipsoidal cross section. The cross sectional area of the portion 113 or 113′ can be adjusted by, for example, controlling accelerating voltage of electron beam. In an alternative embodiment, the innermost portion may be in the gel state and the outer portion may be in the liquid state.

The optical waveguide according to the present invention is used as a medical catheter, a light wave composer, an optical waveguide for an optical IC, a sensor and a light guide and further for optical communication. In addition, it can be used for LED and a semiconductor laser.

The present invention will be explained in detail by following examples.

EXAMPLE 1

In a tube made of a tetrafluoroethylene/hexafluoropropylene copolymer (hereinafter referred to as "FEP") of 6 mm in inner diameter, 8 mm in outer diameter and 5 m in length which had been washed with a dust-free solvent, liquid polydimethylsiloxane having a weight average molecular weight of $1.5 \times 10^5$ which had been filtered through a 2 μm filter was filled. Then, a bare red light LED (660 nm) (manufactured by Hikaridenshi Industries) was inserted from one end of the FEP tube. After wrapping a part of the FEP tube near the LED with a sheet of lead foil, electron beam was irradiated along the entire length of the FEP tube at a dose of 7 Mrad to cross link liquid polydimethylsiloxane.

When the LED was energized, red light was emitted from the other end of the FEP tube.

EXAMPLE 2

In a tube made of a silicone rubber of 6 mm in inner diameter, 8 mm in outer diameter and 2 m in length which had been washed with a dust-free solvent, a 15 wt % solution of a fluororubber (Daiel (trade mark) G-901 manufactured by Daikin Industries Ltd.) in methyl ethyl ketone was poured on the inner surface of the silicone rubber tube and the solvent was thoroughly removed. This procedure was repeated twice. Then, liquid polydimethylsiloxane having a weight average molecular weight of $1.5 \times 10^5$ which had been filtered through a 2 μm filter was filled, and a light LED (660 nm) covered with an epoxy resin layer (manufactured by Hikaridenshi Industries) was inserted from one end of the FEP tube. After wrapping a part of the FEP tube near the LED with a sheet of lead foil, electron beam was irradiated along the entire length of the FEP tube at a dose of 3 Mrad to change liquid polydimethylsiloxane into the gel state. Thereafter, each end region of 20 cm was further irradiated at a dose of 4 Mrad to solidify polydimethylsiloxane in the end regions.

When the LED was energized, red light was emitted from the other end of the FEP tube.

EXAMPLE 3

In a FEP tube of 5 mm in inner diameter, 7 mm in outer diameter and 2 m in length which had been washed with a dust-free solvent, liquid polydimethylsiloxane having a weight average molecular weight of $1.5 \times 10^5$ was filled and both ends of the tube was sealed with glass rods. The entire length of the FEP tube was irradiated by electron beam at a dose of 7 Mrad to solidify polydimethylsiloxane, and then the glass rods were removed. The FEP tube containing solidified polydimethylsiloxane was cut into halves 120 and inserted in the bottom half of a black plastic case 121 through taps 122 as shown in FIG. 12. In the end portions of the FEP tube containing no polydimethylsiloxane, addition cross linking type polysiloxane 123 was poured and then a red LED 124 (manufactured by Hikaridenshi Industries) and a photodiode 125 (manufactured by Hamamatsu Photonics) were inserted therein, respectively. Over the LED and the photodiode, an epoxy resin 126 was poured. Finally, the each terminal was connected to a pin connector 127 attached to the upper half of the case 121 to complete the optical element integrated optical waveguide. When the LED was energized and the both end of the FEP tubes 120 was faced with a distance of several centimeters, the emitted red light was detected by the photodiode.

What is claimed is:

1. An optical element integrated optical waveguide comprising
   (1) a polymeric supporting member a length of which lies in a light transmission direction and which has at least one bore along its entire length,
   (2) at least one optical waveguide part consisting of organic siloxane polymer filling at least one bore, and
   (3) at least one optical element embedded in the optical waveguide part.

2. The optical element integrated optical waveguide according to claim 1, which further comprises an intermediate layer provided with between the supporting member and the optical waveguide part.

3. The optical element integrated optical waveguide according to claim 1, which further comprises a rod like member and/or a tube like member embedded in the optical waveguide part and/or a wall of the supporting member and/or inserted in the bore in which organic siloxane polymer is not filled.

4. The optical element integrated optical waveguide according to claim 1, wherein the optical waveguide part is cured or in a gel state.

5. The optical element integrated optical waveguide according to claim 1, wherein the cross linking degree of the siloxane polymer in the optical waveguide part varies from part to part.

6. The optical element integrated optical waveguide according to claim 1, wherein the siloxane polymer in the optical waveguide part is cross linked at both end regions and the rest is in a liquid or gel state.

7. The optical element integrated optical waveguide according to claim 1 which comprises at least two independent optical waveguide parts.

8. The optical element integrated optical waveguide according to claim 1 which comprises at least one vacant bore.

9. The optical element integrated optical waveguide according to claim 1, wherein a refractive index of the supporting member is lower than that of the optical waveguide part.

10. The optical element integrated optical waveguide according to claim 2, wherein a refractive index of the intermediate layer is smaller than that of the optical waveguide part.

11. An optical element integrated optical wave-guide as in claim 1 wherein the optical element is a photodiode.

12. An optical element integrated optical wave-guide as in claim 1 wherein the optical element is a light emitting diode.

13. A method for producing an optical element integrated optical waveguide which comprises the steps of:
    pouring organic siloxane polymer in at least one bore of a polymeric supporting member a length of which lies in a light transmission direction and which has at least one bore along its entire length,
    inserting an optical element in the bore; and
    cross linking at least partially the organic siloxane polymer to form an optical waveguide part.

14. The method according to claim 13 which further comprises applying an intermediate layer on the inner surface of the bore before filling the organic siloxane polymer.

15. The method according to claim 13, wherein the cross linking degree of the organic siloxane polymer varies from part to part.

16. The method according to claim 13, wherein the cross linking degree of the organic siloxane polymer at both end of the optical waveguide part is larger than the rest of the optical waveguide part.

17. The method according to claim 13, wherein the supporting member has at least two bores and at least one of the bore is filed with the liquid organic siloxane polymer.

18. The method according to claim 13, wherein the organic siloxane polymer is cross linked by irradiation.

* * * * *